3,170,209
FASTENER
Richard K. Parry, 1233 E. Sierra Madre Ave., Glendora, Calif.
Filed Feb. 20, 1963, Ser. No. 259,942
10 Claims. (Cl. 24—222)

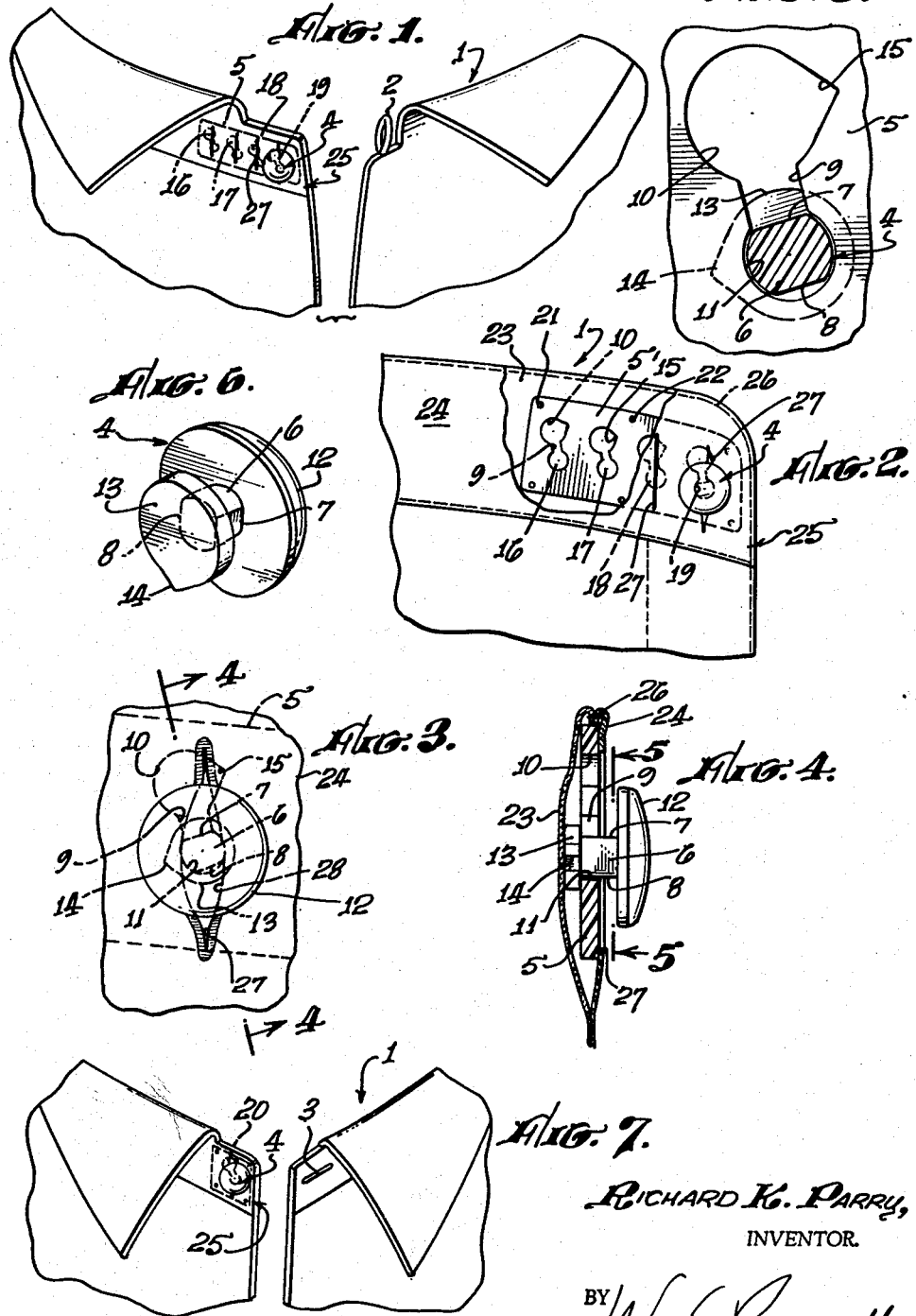

This invention relates to a fastener for two members of an article, here illustrated as a garment, although the fastener may be applied to other types of garment, such as the waistband of a skirt or the flap of a handbag or the like.

An object of the invention is to provide an improved type of button device to receive the usual loop or button-hole on the other article member. More particularly, an object is to provide an improved stud which is removable from its special mount and also to provide a special mount for a plurality of spaced slot devices each removably receiving the stud in order to adjust the spacing of the two article members, means being provided to reduce the likelihood that the stud will be inadvertently removed from its mount. Such means is illustrated as consisting of several items as follows: The mount forms an interlining for the article member which has a facing with a slot or opening communicating with the slot device and arranged at a bias, whereby the fabric of the article tends to maintain the stud in an interlocked position in the mount.

Another feature of the invention is the provision of the slot device inclined downwardly and forwardly with respect to the line of pull between the article members whereby the tension between such members tends to maintain the stud in interlocked position.

Another feature of the invention is the provision of a non-circular cross section for the post of the stud, the slot device having a slot forming a keyway, whereby the stud must be oriented to a particular position to pass from a larger opening at the upper end to a smaller opening at the lower end of the slot device.

A further feature of the invention is the provision of a key on the base of the stud and a corresponding opening for the larger aperture of the slot device, whereby the stud must be oriented to a particular position to enter or leave the slot device.

For further details of the invention, reference may be made to the drawings wherein FIG. 1 is a perspective view of a shirt having a neckband provided with the fastener of the present invention.

FIG. 2 is an enlarged view of a portion of FIG. 1 with parts broken away.

FIG. 3 is an enlarged view of the stud and a single slot device.

FIG. 4 is a sectional view of line 4—4 of FIG. 3.

FIG. 5 is an enlarged sectional view on line 5—5 of FIG. 4.

FIG. 6 is a perspective view of the stud employed in the other figures.

FIG. 7 is a perspective view of a garment having a single fastener according to the invention.

Referring in detail to the drawings, FIG. 1 shows the collar of a shirt 1, one side of the collar having the usual loop 2 or it may have a buttonhole 3 as shown in FIG. 7. In FIG. 1, the fastener comprises a stud 4 and a mount 5. The stud 4 in reversed position is shown in FIG. 6 as having a post 6 having opposite parallel flat sides 7 and 8 which slidingly fit the slot 9 which connects upper aperture 10 and a lower smaller aperture 11. At its upper end, the post 6 has a comparatively large button-like member 12. At the lower end of post 6 is a smaller base member 13 which slidingly fits or passes through aperture 10 when the lateral projection 14 on base 13 coincides with a corresponding notch 15 at one side of the opening 10. The members 10 and 13 are otherwise circular but rendered non-circular by reason of the key or projection 14 and notch 15 which act as a guard to require that the key-like base 13 be oriented about its axis to bring projection 14 into coincidence with the notch 15, so that the stud 4 can be inserted in or removed from opening 10.

The mount 5 for the stud may have a plurality of slot devices each like 9, 10, 11, as shown at 16, 17, 18, 19 in FIGS. 1 and 2, or the mount may carry a single slot device as shown at 20 in FIG. 7. As shown at 5' in FIG. 2, the mount 20 has a plurality of spaced holes like 21, 22 for stitching to fasten the mount between the back layer 23 and the front layer 24 of the neckband 25, the parts 23 and 24 being fastened together by suitable stitching, indicated at 26. The front layer 24 over each one of the slot devices 16 to 19 has an elongated opening like 27, see FIGS. 2 and 3, each opening 27 being upright and hence on a bias with each slot device like 19, the middle of the opening 27, as shown at 28 in FIG. 3, being in register with the smaller aperture 11 whereby the body of the fabric at the sides of opening 27 acts to hold or urge the stud in the smaller opening 11. The post 6 is generally cylindrical and of a size slightly smaller than the diameter of smaller aperture 11, the stud 4 freely rotating in the aperture 11.

Thus there are several features which contribute to the inadvertent removal of stud 4 from its mount 5, as follows:

(1) The fabric of the outer or front layer 24 tends to maintain the stud in the smaller aperture 11.

(2) The pull between the article members, i.e. the pull of loop 2 or button hole 3 tends to keep the stud in the lower aperture as the slot device like 16 to 19 is downwardly, forwardly inclined.

(3) The flat sides 7, 8 of the post prevent the post from passing into the slot 9 unless the post has a particular orientation.

(4) Entry of the stud 4 into, or its removal from, the larger aperture 10 is prevented in the absence of a particular orientation due to the key 14 and key slot or notch 15.

Various modifications may be made in the invention as the fastener is of general utility. For example, it may be used for the front, or cuffs of a shirt, for the waistband of a skirt, or in general in situations where it is desired to fasten two members together. To further guard against the possibility that the stud may work loose from its mount, the distance between the sides 7 and 8 may be the same as, or a trifle greater than the width of slot 9, whereby it is necessary to use some force against the flexibility of the mount in order to move the stud from the large aperture 10 to the smaller aperture 11, an equal force being required to move the stud back to aperture 10.

I claim:

1. A fastener for an article comprising the combination of a stud and a mount therefor, said stud having a post having on the outer end thereof a button-like head of a certain size, said post having on the inner end thereof a button-like base member of smaller size, said mount having a comparatively large aperture of a size to pass said base member, said aperture being smaller than said head, said aperture opening into a slot larger than said post, said slot opening into a smaller aperture, said smaller aperture being larger than said post and smaller than said base member, an article having inner and outer layers, and means for securing said mount to said inner layer, said outer layer having an opening communicating with said apertures and said slot, said slot terminating at its upper and lower ends in said large and smaller apertures respectively, said opening being on a bias with said slot and in register with said smaller aperture whereby the body of the outer layer of said article acts as a guard to resist return of said stud from said smaller aperture to said large aperture.

2. A fastener for an article comprising the combination of a stud and a mount therefor, said stud having a post having on the outer end thereof a button-like head of a certain size, said post having on the inner end thereof a button-like base member of smaller size, said mount having a comparatively large aperture of a size to pass said base member, said aperture being smaller than said head, said aperture opening into a slot larger than said post, said slot opening into a smaller aperture, said smaller aperture being larger than said post and smaller than said base member, an article having inner and outer layers, and means for securing said mount to said inner layer, said outer layer having an opening communicating with said apertures and said slot, said slot terminating at its upper and lower ends in said large and smaller apertures respectively, said base member having a lateral projection acting as a key, said large aperture having a corresponding notch, said lateral projection and notch acting as a guard to restrict entry or withdrawal of said smaller base member to a particular relative orientation thereof.

3. A fastener comprising the combination of a stud and a mount therefor, said stud having a post having on the outer end thereof a button-like head of a certain size, said post having on the inner end thereof a button-like base member of a smaller size, said mount having a comparatively large upper aperture of a size to pass said base member, said aperture being smaller than said head, said aperture opening into a slot larger than said post, said slot opening into a smaller lower aperture, said slot terminating at its upper and lower ends in said large and smaller apertures respectively, said smaller aperture being larger than said post and smaller than said base member, said base member having a lateral projection acting as a key, said large aperture having a corresponding notch, said lateral projection and notch acting as a guard to restrict entry or withdrawal of said smaller base member to a particular relative orientation thereof.

4. In a fastener for two members of an article, one article member having an opening removably fitting a fastening device on the other article member, the improvement wherein said fastening device comprises the combination of a stud and a mount therefor, said stud having a post having on the outer end thereof a button-like head of a certain size, said post having on the inner end thereof a button-like base member of smaller size, said mount having a slot device comprising a comparatively large upper aperture of a size to pass said base member, said aperture being smaller than said head, said aperture opening into a slot larger than said post, said slot opening into a smaller lower aperture, said smaller aperture being larger than said post and smaller than said base member; said slot being downwardly forwardly inclined on said mount, whereby the line of pull between said article members tends to maintain said stud in said smaller aperture.

5. In a fastener according to claim 4 wherein said article is an article of clothing, said mount being of plastic material and forming an interlining for the band of the article.

6. In a fastener according to claim 4, said mount having a plurality of spaced slot devices, each comprising a large aperture, slot and smaller aperture, said stud removably fitting in any one of said slot devices for adjusting the spacing of said members.

7. In a fastener for two members of an article, one article member having an opening removably fitting a fastening device on the other article member, the improvement wherein said fastening device comprises the combination of a stud and a mount therefor, said stud having a post having on the outer end thereof a button-like head of a certain size, said post having on the inner end thereof a base of smaller size, said mount having a slot device comprising a comparatively large upper aperture, a lower smaller aperture and connecting slot, said large aperture being of a size to pass said base, said large aperture being smaller than said head, said aperture opening into said slot which is larger than said post, said slot opening into smaller aperture, said smaller aperture being larger than said post and smaller than said base, said slot being downwardly, forwardly inclined on said mount, whereby the line of pull between said article members tends to maintain said stud in said smaller aperture, said other article member having inner and outer layers, means for securing said mount to said inner layer, said outer layer having an opening communicating with said slot device, said opening in said outer layer being on a bias with said slot device and in register with said smaller aperture whereby the body of the outer layer of said article acts as a guard to resist return of said stud from said smaller aperture to said large aperture, said slot having parallel sides, said post having parallel sides slidably fitting said slot, a portion of the periphery of said post having a size greater than the distance between its parallel sides preventing said post from passing in either direction through said slot unless oriented with its sides juxtaposed with the sides of said slot, said base having a lateral projection acting as a key, said large aperture having a corresponding notch, said lateral projection and notch acting as a guard to restrict entry or withdrawal of said smaller base in the absence of a particular relative orientation thereof.

8. A fastener comprising the combination of a stud and a mount therefor, said stud having a post having on the outer end thereof a button-like head of a certain size, said post having on the inner end thereof a base of smaller size, said mount comprising a piece of plastic material having front and rear portions, said mount having a comparatively large aperture of a size to pass said base, said aperture being smaller than said head, said aperture opening into an inclined slot slidably receiving said post, said slot opening into a small aperture larger than said slot and smaller than said large aperture, said slot terminating at its upper and lower ends in said large and smaller apertures respectively, said small aperture being smaller than said base, said small aperture being closer to said front portion of said mount than said large aperture, and means for fastening said mount in position.

9. In a fastener for two members of an article, one article member having an opening removably fitting a fastening device adjacent the edge of the other article member, the improvement wherein said fastening device comprises the combination of a stud and a mount therefor, said stud having a post having on the outer end thereof a button-like head of a certain size, said post having on the inner end thereof a base of smaller size, said mount having a slot device comprising a comparatively large aperture, a smaller aperture and connecting slot, said large aperture being of a size to pass said base, said large aperture being smaller than said head, said aperture opening into said slot which is larger than said post, said slot opening into said smaller aperture, said smaller aperture being larger than said post and smaller than said base, and means for securing said mount to said other article member adjacent its edge with said slot forwardly inclined towards said edge and with said smaller aperture nearer said edge than said large aperture whereby the line of pull between said article members tends to maintain said stud in secured position in said smaller aperture.

10. In a fastener according to claim 9, said other article member having inner and outer layers, said securing means acting to secure said mount to said inner layer, said outer layer having an opening opposite and on a bias with said smaller aperture whereby said outer layer tends to maintain said stud in said smaller aperture.

References Cited by the Examiner

UNITED STATES PATENTS

| | | | |
|---|---|---|---|
| 604,542 | 5/98 | Parker | 24—206 |
| 1,354,095 | 9/20 | Evans | 24—222 |
| 2,076,925 | 4/37 | Steinberg. | |

FOREIGN PATENTS

| | | |
|---|---|---|
| 13,015 | of 1903 | Great Britain. |
| 18,717 | of 1907 | Great Britain. |
| 5,121 | of 1908 | Great Britain. |
| 457,802 | 12/36 | Great Britain. |
| 171,014 | 10/34 | Switzerland. |

DONLEY J. STOCKING, *Primary Examiner*.